(12) United States Patent
Cherian et al.

(10) Patent No.: US 8,675,630 B2
(45) Date of Patent: Mar. 18, 2014

(54) SYSTEMS AND METHODS FOR MULTIPLEXING MULTIPLE CONNECTIONS IN MOBILE IP NETWORK

(75) Inventors: George Cherian, San Diego, CA (US); Jun Wang, La Jolla, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 12/468,824

(22) Filed: May 19, 2009

(65) Prior Publication Data

US 2009/0290540 A1 Nov. 26, 2009

Related U.S. Application Data

(60) Provisional application No. 61/055,387, filed on May 22, 2008.

(51) Int. Cl.
*H04W 4/00* (2009.01)
*H04B 7/212* (2006.01)

(52) U.S. Cl.
USPC ........... 370/348; 370/328; 370/329; 370/338; 370/443

(58) Field of Classification Search
USPC ........................................................ 370/348
See application file for complete search history.

(56) References Cited

U.S. PATENT DOCUMENTS

| | | | |
|---|---|---|---|
| 6,519,254 B1 * | 2/2003 | Chuah et al. | 370/389 |
| 6,977,932 B1 * | 12/2005 | Hauck | 370/392 |
| 7,254,114 B1 * | 8/2007 | Turner et al. | 370/244 |
| 2002/0090940 A1 * | 7/2002 | Chen et al. | 455/422 |
| 2002/0172175 A1 * | 11/2002 | Okamura | 370/338 |
| 2003/0156541 A1 | 8/2003 | Haihong | |
| 2003/0185196 A1 | 10/2003 | Venkitaraman | |
| 2004/0029555 A1 * | 2/2004 | Tsai et al. | 455/403 |
| 2004/0032844 A1 * | 2/2004 | Lewis et al. | 370/338 |
| 2004/0047320 A1 * | 3/2004 | Eglin | 370/338 |

(Continued)

FOREIGN PATENT DOCUMENTS

| | | |
|---|---|---|
| JP | 2003244746 A | 8/2003 |
| JP | 2010507301 A | 3/2010 |

(Continued)

OTHER PUBLICATIONS

International Search Report and Written Opinion—PCT/US2009/045072, International Search Authority—European Patent Office—Oct. 5, 2010.

(Continued)

*Primary Examiner* — Ian N Moore
*Assistant Examiner* — Jenee Alexander
(74) *Attorney, Agent, or Firm* — James T. Hagler (57) ABSTRACT

Disclosed are systems, methods and computer program products for facilitating multiplexing of simultaneous multiple connections between a mobile device and its IP mobility anchors, such as mobile IP home agents or proxy mobile IP local mobility anchors. An example method comprises assigning a unique IP mobility anchor identifier to each IP mobility anchor associated with the mobile device. The method further comprises negotiating an IP flow reservation for each IP mobility anchor identifier and signaling a request to associate each negotiated IP flow with an IP tunnel to a particular IP mobility anchor. The method further comprises sending packets through each negotiated IP flow and associated IP tunnel to each IP mobility anchor.

31 Claims, 9 Drawing Sheets

(56) References Cited

U.S. PATENT DOCUMENTS

| | | | |
|---|---|---|---|
| 2004/0047348 A1* | 3/2004 | O'Neill | 370/389 |
| 2004/0170125 A1* | 9/2004 | O'Neill | 370/230 |
| 2004/0246933 A1* | 12/2004 | Valko et al. | 370/329 |
| 2005/0094611 A1* | 5/2005 | Cheong et al. | 370/342 |
| 2006/0045128 A1 | 3/2006 | Madour | |
| 2006/0154671 A1* | 7/2006 | Kang et al. | 455/450 |
| 2006/0274716 A1 | 12/2006 | Oswal et al. | |
| 2007/0077947 A1 | 4/2007 | Rossetti | |
| 2007/0189219 A1* | 8/2007 | Navali et al. | 370/331 |
| 2007/0189255 A1* | 8/2007 | Navali et al. | 370/338 |
| 2007/0254661 A1* | 11/2007 | Chowdhury et al. | 455/436 |
| 2008/0291867 A1* | 11/2008 | Weniger et al. | 370/328 |
| 2009/0016270 A1* | 1/2009 | Tsirtsis (Georgios) et al. | 370/328 |
| 2009/0052425 A1 | 2/2009 | Aso et al. | |

FOREIGN PATENT DOCUMENTS

| | | | |
|---|---|---|---|
| RU | 2272363 C2 | 3/2006 | |
| RU | 2314657 C2 | 1/2008 | |
| WO | 2006129855 A1 | 12/2006 | |
| WO | WO 2007068266 A1 * | 6/2007 | H04Q 7/38 |
| WO | WO2007108422 A1 | 9/2007 | |
| WO | 2007115629 A1 | 10/2007 | |
| WO | WO2008046655 A1 | 4/2008 | |

OTHER PUBLICATIONS

Sarikaya, B., et al., "PMIPv6 Route Optimization Protocol draft-qin-netlmm-pmipro-00.txt", Feb. 11, 2008.

Taiwan Search Report—TW098117097—TIPO—Jul. 10, 2013.

* cited by examiner

SYSTEMS AND METHODS FOR MULTIPLEXING MULTIPLE CONNECTIONS IN MOBILE IP NETWORK

CLAIM OF PRIORITY UNDER 35 U.S.C. §119

The present Application for Patent claims priority to Provisional Application No. 61/055,387 entitled "System and Methods for Providing Multiple IP Mobility Connectivity Over HRDP" filed May 22, 2008, and assigned to the assignee hereof and hereby expressly incorporated by reference herein.

BACKGROUND

1. Field

This disclosure relates generally to the field of wireless communications and more specifically to the systems and methods for providing multiple connections in a mobile Internet Protocol (IP) network.

2. Background

Wireless communication systems are widely deployed to provide various types of communication content such as voice, data, and so on. These systems may be multiple-access systems capable of supporting communication with multiple mobile devices by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, 3GPP Long Term Evolution (LTE) systems, and the like.

Most current wireless communication system support Internet Protocol (IP) based packet-switched networking for data and voice communications and, in particular, two most commonly used versions of the protocol, namely IPv4 and IPv6. Both versions of the protocol provide mobility support and allow mobile devices to remain reachable while moving between various wireless networks. In general, mobile IP allows a mobile device to move from one network to another without changing the mobile device's "home address" (HoA), which is assigned to the mobile device by its home agent (HA), also referred to as a Local Mobility Anchor (LMA), residing in the home network. Packets may be routed to the mobile device using this address regardless of the mobile device's point of attachment in a foreign network.

For example, to remain reachable in IPv6 domain, a mobile device must create and maintain a binding between its HoA assigned by the HA and its "care-of address" (CoA) in the foreign network by exchanging signaling messages with its home agent. Alternatively, the binding may be created and maintained by the network without the involvement of the mobile device. In this approach, a proxy agent in the foreign network performs the signaling with the local mobility anchor (LMA) in the home network and does the mobility management on behalf of the mobile device. In turn, HAs/LMAs manage distribution of home addresses to the mobile devices, manage devices' binding states, and specify which services and applications are available to the mobile devices.

Different HAs/LMAs provide different types of services, such as IMS, public internet service, etc. To access these services, a mobile device should request simultaneous connectivity to multiple HAs/LMAs. However, some wireless communication systems supporting both mobile IPv4 and IPv6, such as High Rate Packet Data (HRPD) technology implemented in CDMA2000, generally allow only a single HA/LMA connection for each mobile device and require all HAs/LMAs to assign IPv4 addresses to the mobile devices from the same address space because of the scarcity of available IPv4 addresses. With the growing popularity of mobile devices and demand for usage of differentiated services, there is a need for a solution to support simultaneous connectivity to multiple HAs/LMAs over HRPD and other protocols supporting IPv4 and IPv6 mobility.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating multiplexing of simultaneous multiple connections between a mobile device and its IP mobility anchors, such as mobile IP home agents or proxy mobile IP local mobility anchors. An example method comprises assigning a unique IP mobility anchor identifier to each IP mobility anchor associated with the mobile device; negotiating an IP flow reservation for each IP mobility anchor identifier; signaling a request to associate each negotiated IP flow with an IP tunnel to a particular IP mobility anchor; and sending packets through each negotiated IP flow and associated IP tunnel to each IP mobility anchor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software stored on non-transitory media, or software in execution on a processor. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a personal digital assistant (PDA), a handheld device having wireless connection capability, a laptop computer, or other processing device connected to a wireless modem.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM , etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
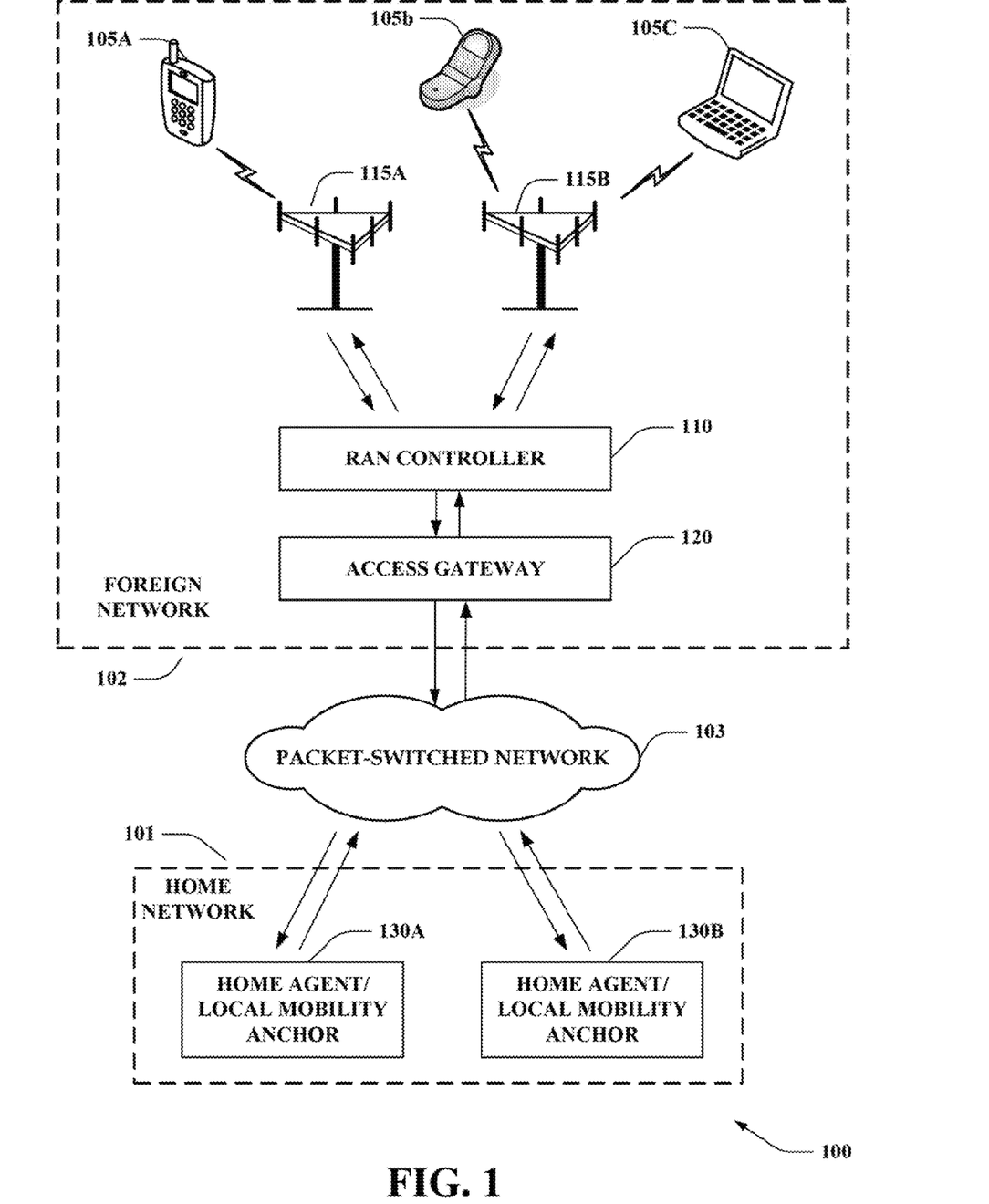
FIG. 1 is an illustration of a wireless communication system in accordance with various aspects set forth herein.

Referring now to FIG. 1, a wireless communication system 100 is illustrated in accordance with various embodiments presented herein. System 100 comprises one or more home networks 101 for a plurality of mobile devices 105 and a foreign network 102 in which the mobile devices 105 are currently located. Home and foreign networks may be connected via a packet-switched network 103, such as the Internet. Foreign network 102 may be a radio access network (RAN), such as CDMA2000 or any other type of wireless communication system. Generally, foreign network 102 may include a RAN controller 110, a plurality of radio base stations 115 and an access gateway 120. Radio base stations 115 may include multiple antenna groups and/or a transmitter/receiver chain that can in turn comprise a plurality of components associated with radio signal transmission and reception (e.g., processors, modulators, multiplexers, antennas, etc. (not shown)) to and from the mobile devices 115. Home network 101 may be a wireless or wired network and may include a plurality of home agents (HA) 130, which are also referred herein as local mobility anchors (LMA).

More specifically, foreign RAN 102 provides wireless connectivity to mobile device 115 for accessing services provided by the HAs/LMAs in the home networks 101. RAN controller 110 is network equipment providing data connectivity between mobile devices 115 and the PDSN gateway 120. The main functions of the RAN controller 110 include establishment, maintenance, and termination of radio channels; radio resource management; and mobility management. The radio channels between mobile devices 115 and RAN controller 110 are known as radio link protocol (RLP) flows. Mobile device 115 generally negotiates a reservation with RAN controller 110 for a different RLP flow for different services provided by the HAs/LMAs in its home network 101, as will be described in greater detail herein below. In one example, RAN controller 110 supports a Packet Control Function (PCF), which controls the transmission of packets between the RAN controller 110 and the PDSN gateway 120 using bearer connections through an A10 data interface and an A11 signaling interface.

In one aspect, the access gateway 120 aggregates data traffic from multiple RAN controllers and provides access to a packet-switched network 103, such as the Internet, intranets, and home networks 101 for mobile devices 115 utilizing CDMA2000 or other radio access technology. The access gateway 120 may be implemented as a Packet Data Serving Node (PDSN) in accordance with one example embodiment. If system 100 supports Mobile IPv4 or IPv6 protocol, access gateway 120 provides mobile IPv4 and IPv6 packet transport for signaling and data transmission/reception to/from mobile devices 115 and their home agents (HA) 130. In particular, when data packets are received through the A10/A11 bearer connection from mobile device 115, access gateway 120 identifies HA 130 of mobile device 115 using binding state information associated with the device's home address (HoA), creates a bidirectional tunnel with the device's HA 130, encapsulates the received packet in a new packet with access gateway's source address as a care-of-address (CoA), and transmits the encapsulated packets through the tunnel to the appropriate HA. When data packets are received through the tunnel from HA 130, PDSN gateway 120 de-encapsulates them based on the binding state information associated with the HA 130 and forwards them through the appropriate bearer connection to the mobile device 115.

If system 100 supports Proxy Mobile IPv6 protocol, then, in addition to the services outlined above, access gateway 120 also functions as a proxy agent, referred to as a Mobile Access Gateway (MAG) in the Proxy Mobile IPv6 specification RFC 5213 published by the Internet Engineering Task Force (IETF). As a proxy agent, PDSN gateway 120 generally manages the mobility-related signaling for mobile devices 115 attached to the foreign network 102, so that binding with the LMA of each mobile device may be created and maintained by the network without involvement of the mobile device. As such, access gateway 120 is responsible for tracking the mobile devices' movements to and from the foreign network 102 and for signaling Proxy Binding Updates (PBU) on behalf of the mobile devices 115 to its LMA 130. Access gateway 120 may also provide Authentication, Authorization and Accounting (AAA) services and the other services.

Home Agent 130, as defined in Mobile IPv6 base specification RFC 3775, is the topological anchor point for the mobile device's home network prefix(es) and is the entity that manages the mobile device's binding state. Local Mobility Anchor (LMA) 130 has the functional capabilities of HA 130 with the additional capabilities required for supporting Proxy Mobile IPv6 specification RFC 5213. Binding is the association of the mobile device's HoA in the home network 101 with its CoA in the foreign network 102. HoA is an address from a mobile device's home network prefixes specified by HAs/LMAs 130. Mobile devices 115 can have multiple HoAs, for instance when there are multiple home prefixes on the home network 101. If the mobile device uses more than one address from its home network prefixes, any one of these addresses is referred to as mobile device's home address. In Mobile IPv6, home agent 130 is generally aware of the home addresses of the mobile device 115. However, in Proxy Mobile IPv6, the mobility entities, such as proxy agent 120 and LMAs 130, are only aware of the mobile device's home network prefixes and are not always aware of the exact addresses that the mobile devices 115 use to establish connections to HAs/LMAs 130.

This lack of awareness on the part of the network about exact assignments of home addresses to mobile device 115 becomes a problem when the mobile device attempts to set up simultaneous connections to multiple HAs/LMAs. This problem can be best illustrated as follows: In case of unique home network prefix assignment by each HA/LMA to the mobile device, the connection request from the mobile device 115 would indicate its HoA chosen from the assigned home network prefixes, so that access gateway 120, which acts as a proxy agent in Proxy Mobile IPv6 domain, would know exactly which HA/LMA 130 the given connection should be directed to. However, when HA/LMA 130A and HA/LMA 130B assign home network prefixes from the same address space, mobile device 115 selects its home addresses from the home network prefix space associated both with HA/LMA 130A and HA/LMA 130B. In this case, when the data comes from mobile device 115, access gateway 120 does not know whether to direct this data traffic to HA/LMA 130A or to HA/LMA 130B.

Figure 2:
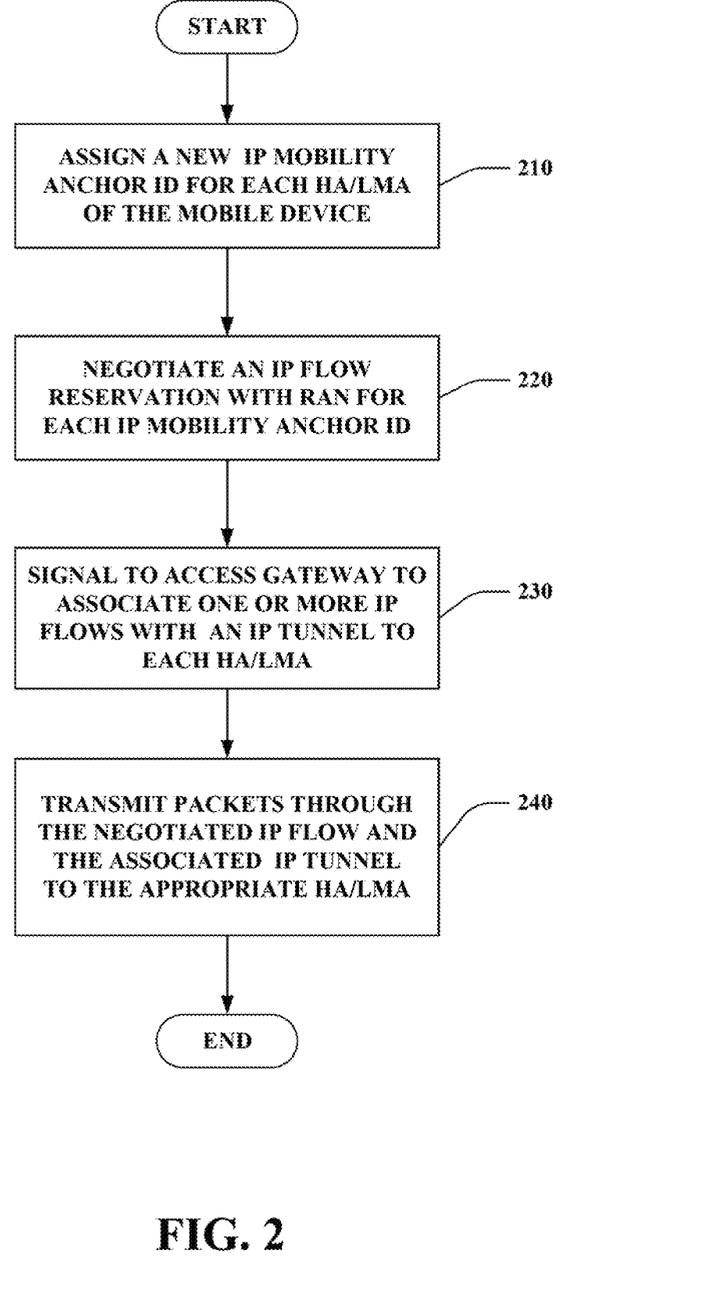
FIG. 2 is an illustration an example methodology for multiplexing of simultaneous multiple HA/LMA connections in a wireless communication system.

To address this problem, an example methodology for multiplexing multiple simultaneous HAs/LMAs connections is depicted in FIG. 2. In step 210, mobile device 115 may create and assign a unique IP mobility anchor identifier to each HA/LMA 130 to which it wants to connect. In step 220, the mobile device may negotiate with RAN 110 for IP flows (e.g., RLP flows) for each IP mobility anchor identifier. The RAN in turn may set up respective bearer connections (e.g., A10/A11 connections) to access gateway 120 to support the negotiated IP flows from mobile device 115. In step 230, mobile device 115 may signal a request to access gateway 120 to associate each negotiated IP flow with an IP tunnel to a particular HAs/LMAs 130. In step 240, mobile node 15 transmits packets through the negotiated IP flow and associated IP tunnel to the appropriate HA/LMA 130. The packets sent through each negotiated IP flow are being multiplexed by access gateway 120 into the appropriate IP tunnels based on the association of the IP flow with the specified HA/LMA 130. Thus, based on these aspects, each IP flow directly corresponds to a specified HA/LMA 130.

Figure 3:
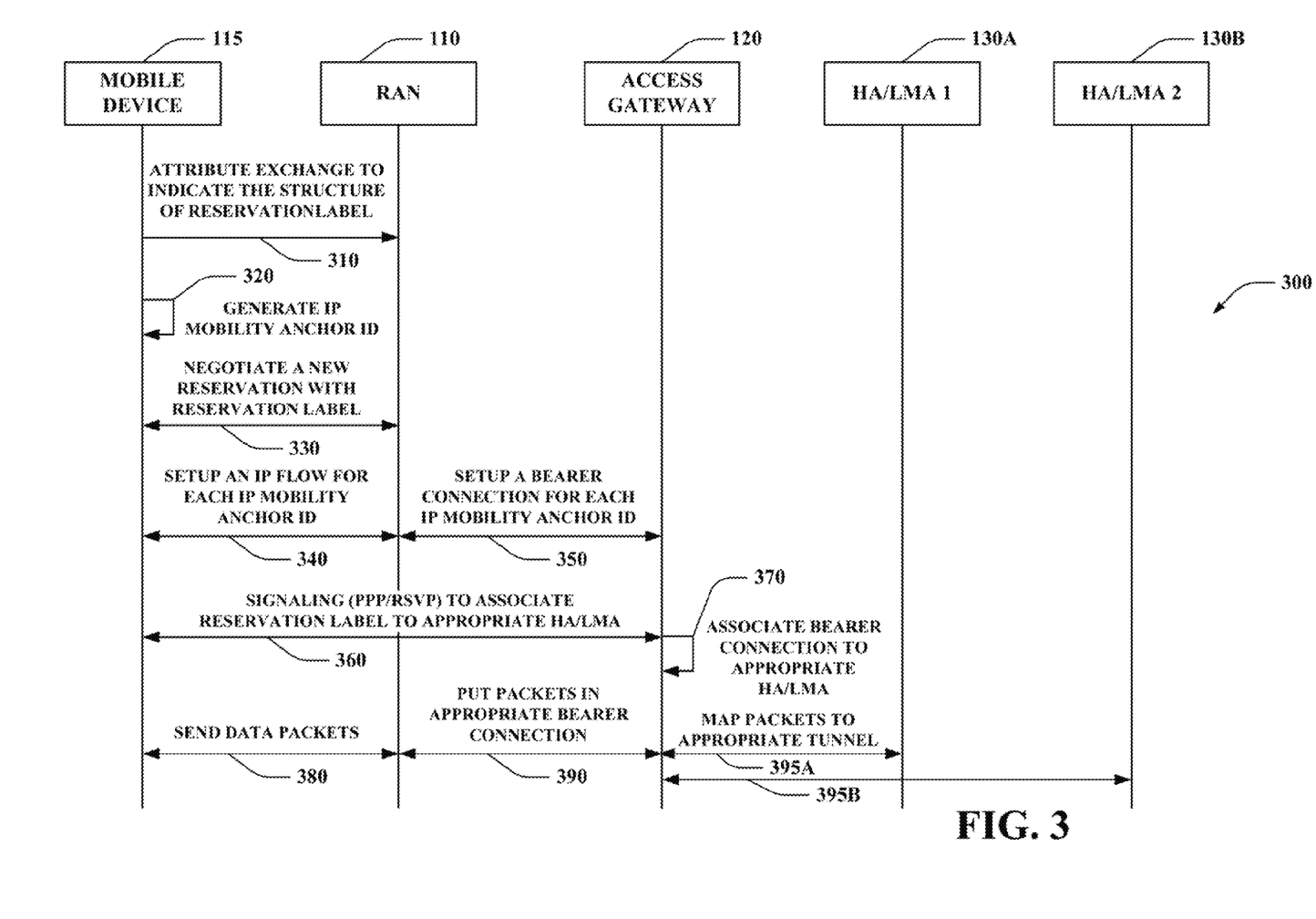
FIG. 3 is an illustration another example methodology for multiplexing of simultaneous multiple HA/LMA connections in a wireless communication system.
Figure 6:
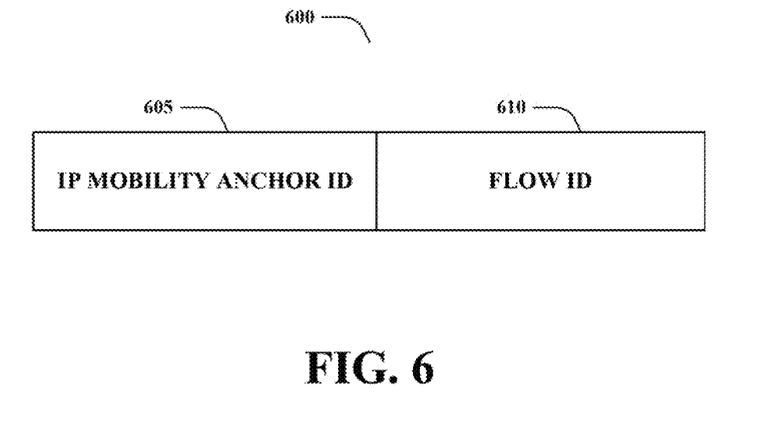
FIG. 6 is an illustration of an example reservation label for facilitating multiplexing of simultaneous multiple HA/LMA connections.

FIG. 3 depicts another example methodology for multiplexing of simultaneous multiple HA/LMA connections from a mobile device. In step 310, mobile device 115 creates a new IP flow reservation label for multiple HA/LMA connectivity. An example structure of the reservation label 600 is depicted in FIG. 6. In one example, the reservation label 600 may be an 8 bit string of which the 4 most significant bits may be used to store an IP mobility anchor identifier 605 for a HA/LMA 130 and the 4 least significant bits may store IP flow identifier 610, such as RLP flow identifier. At the same time, mobile device 115 may create a new HRPD attribute for the new reservation label, which identifies the structure of the new reservation label. The 8 bit reservation label may be used to identify 15 different HAs/LMAs and 15 different IP flows. Those of ordinary skill in the art will appreciate that the reservation label may be longer or shorter depending on the system resources and requirements. In addition, the size of the IP mobility anchor identifier and IP flow identifier may vary depending on the number of HAs/LMAs 130 available for simultaneous access. The attribute for the new reservation label may be communicated by the mobile device 115 to RAN controller 110 and/or other network components, so that they know how to interpret the new label.

In step 320, mobile device 115 may generate a unique IP mobility anchor identifier for every HA/LMA 130 the mobile device wants to connect to. For example, for a 4-bit long identifier, the mobile device may select a value in the range of 1-16. For a 5-bit identifier, the range is from 1-32. Notably, the selection of IP mobility anchor identifier is at the complete discretion of mobile device 115, and any number in the specified range may be selected as long as it is uniquely identifies the HA/LMA 130 which it represents. No two HAs/LMAs 130 may have the same IP mobile anchor identifier.

In step 330, a new IP flow for the defined reservation label is negotiated between mobile device 115 and RAN controller 110. During negotiation, the application of the mobile device identifies the specific protocols, QoS parameters, and resources that are needed from the network to support the IP flow requested by the mobile device. For instance, the specific protocols, QoS parameters, and resources that are needed from the network may be a function of the requesting application or service, e.g. a voice call application may have one set of requirements, whereas a data call application may have another set of requirements.

In step 340, mobile device 115 and RAN 110 set up a RLP flow for each IP mobility anchor identifier. Multiple reservations that belong to same IP mobility anchor identifier may share the same RLP-flow, for example, if the QoS requirements remain the same, otherwise different RLP flows may be setup. Once the RAN controller 110 has accepted the mobile node's QoS request, and from this point onward, it is the RAN controller 110 that will control the configuration, activation, and association of the QoS flows at the RLP layer, and eventually at the RTCMAC layer.

In step 350, RAN controller 110 creates at least one bearer connection (e.g., A10/A11 connection) per IP mobility anchor identifier that is associated with the reservation label. In other words, no two reservations with different IP mobility anchor identifiers may share the same A10/A11 flow. The A11 interface carries signaling information between the Packet Control Function (PCF) and access gateway 130. The A10 interface carries user traffic between the PCF and the access gateway 130.

In step 360, mobile device 115 may signal to the access gateway 120 with instructions to associate the reservation label to the appropriate HA/LMA 130. Reservation labels are exchanged to identify which HA/LMA and which IP flow the packets correspond to. For example, mobile device 115 may specify the ID/Name of the HA/LMA device, such as "service.domain-name". When PDN-gateway acts as the LMA, the mobile devices may specify the Access Point Name (APN) of the PDN-gateway. The signaling between mobile device 115 and access gateway 120 may be performed using PPP, RSVP, SIP or other signaling protocols.

In step 370, PDSN associates the A10 connection from RAN 110 established in step 350 to the HA/LMA's Name/ID specified in the signaling message from the mobile device based on the IP mobility anchor identifier specified in the reservation label. In this manner, packets transmitted from the mobile device 115 via the IP flow associated with the reservation label are mapped by the access gateway into one or more IP tunnels based on the association of the IP flow with the particular IP mobility anchor.

In step 380, mobile device 115 transmits packets using the negotiated IP flow over radio network 102 to the RAN controller 110, which puts packets on the appropriate bearer connection for delivery to PDSN gateway 120 in step 390. In steps 395A and 395B, the access gateway maps the received packets to the appropriate channel based on the association of the IP flow with the particular IP mobility anchor, encapsulates the packets and sends them through the tunnel to the IP mobility anchor, either HA/LMA 130A or HA/LMA 130B. In this manner, multiplexing of simultaneous multiple HA/LMA connections over PMIP network is accomplished.

In one aspect, an example methodology is provided for assigning multiple home addresses to mobile device 115 in proxy mobile IP (PMIP) domain. This process of IP address assignment is generally performed before mobile device 115 initiates a communication session with the HA/LMA 130 as described in diagram 300 above. In one aspect, mobile device 115 may utilize Point-to-Point (PPP) protocol to obtain HoA assignment from HA/LMA 130. In another aspect, instead of using PPP, mobile device may use DHCP over auxiliary flow with PDSN gateway.

Figure 4:
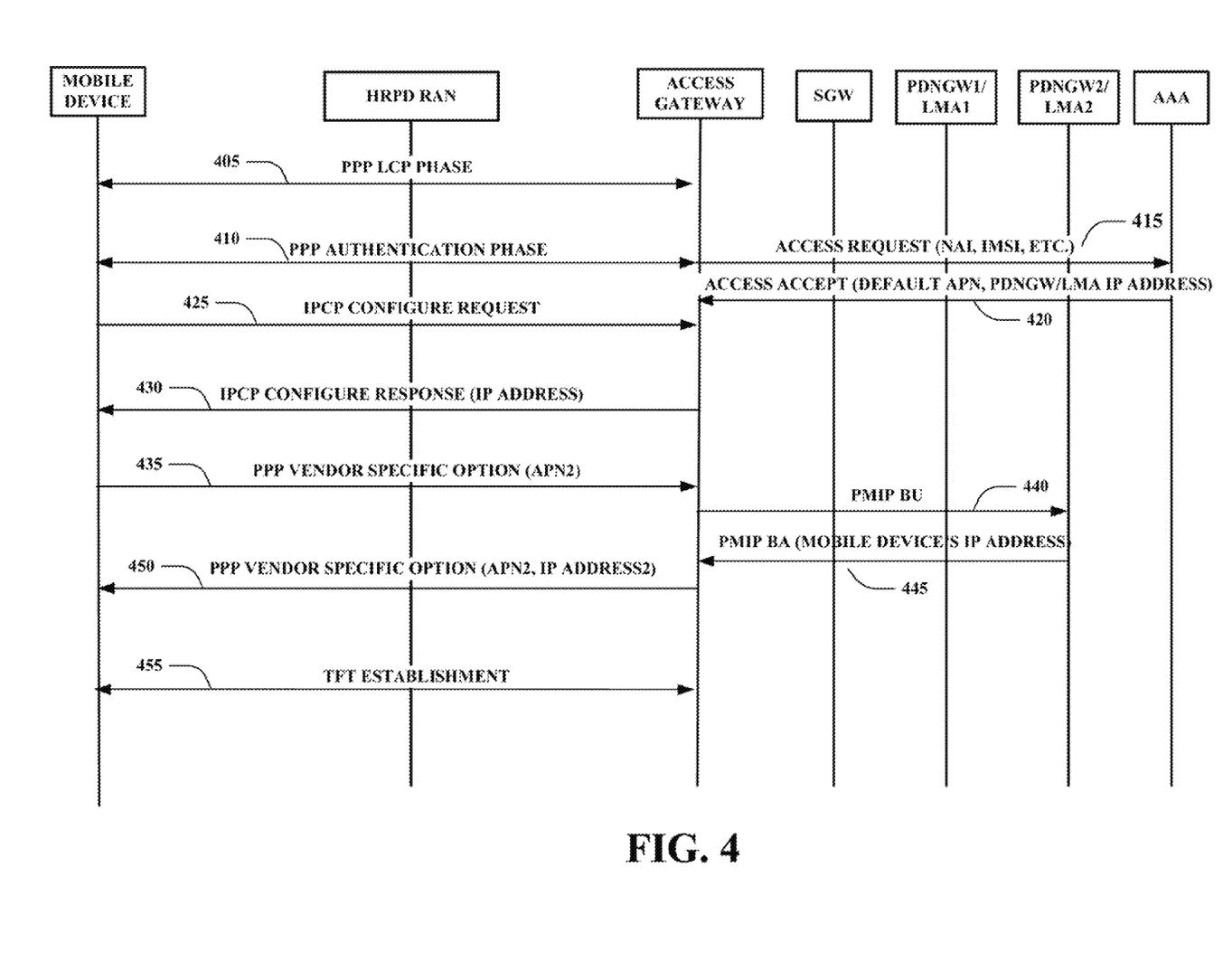
FIG. 4 is an illustration of an example methodology for multiple IP address assignment in a wireless communication system.

FIG. 4 illustrates PPP-based implementation of this method. In step 405, the mobile device executes PPP Link Control Protocol (LCP) in order to establish communications over a point-to-point link and to configure and test the data link with access gateway 130. After the link has been established, the mobile device and access gateway may be authenticated, in step 410. In steps 415 and 420, access gateway executes Authentication, Authorization and Accounting (AAA) services for the mobile device. In steps 425 and 430, mobile device and PDSN gateway exchange PPP Internet Protocol Control Protocol (IPCP) or any network control protocol request and response messages. At step 435, the mobile device sends to the PDSN gateway a name of the LMA to which it wants to connect and from which the mobile device want to obtain a HoA. An example of LMA name could be a "service.domain-name". If a PDN acts as an LMA, then the LMA name would be the Access Point Name (APN) of the PDN. In step 440 and 445, PDSN gateway 130 performs PMIP binding update with LMA2 and receives in response an IP address to be used as a HoA for the mobile device. In step 450, PDSN gateway 130 forwards the newly assigned IP address to the mobile device 115. Using the newly assigned HoA address, mobile device 115 proceeds in step 455 to establish a TFT session with the PDSN gateway to associate the IP flow to the QoS.

The methodologies for providing simultaneous multiple HA/LMA connections disclosed herein may be extended to create multiple PDN-contexts with the same PDN for each type of IP-address (IPv4, IPv6, IPv4/v6) to further improve system resource allocation and utilization. Currently, assignment of a unique PDN-ID to each of the context will consume an additional PDN-ID. Also, based on the current solution, similar-QoS-IP-flows of the PDN contexts of the same PDN are typically forced to be carried on separate RLP flows when the IP address type that is used are different, which is not desirable. In other words, it is desirable to assign IP flows of different PDN contexts of the same PDN on the same RLP flow.

Figure 7:
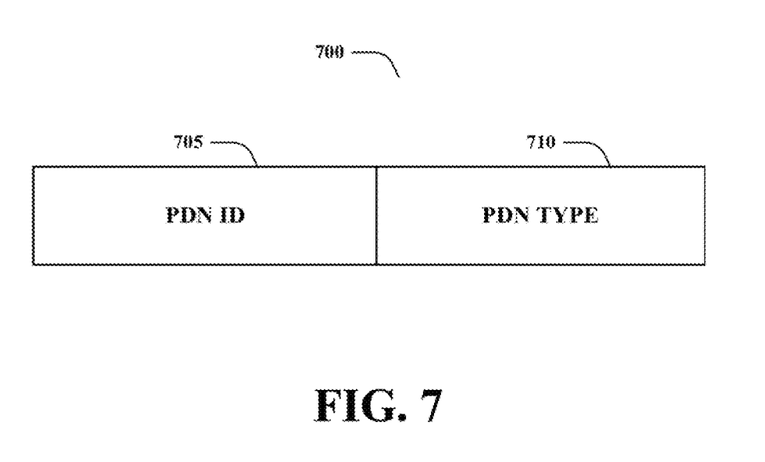
FIG. 7 is an illustration of an example PDN context identifier.

One example solution to this problem is to create a new identifier namely PDN-context-identifier. FIG. 7 illustrates one example of a structure of PDN-context-identifier 700. As depicted, the upper four bits of the PDN-context ID 700 may be set to PDN-ID 705 and the lower four bits of the PDN-context ID 700 may be set to the PDN-context-type 710. The PDN-context-type could be IPv4, IPv6, IPv4/IPv6, etc. In one example, reservation label remains to be [PDN-ID, flow-id]. The reservation label may be still used for air-interface purposes, such as radio channel setup and RSVP signaling between the mobile device and PDSN gateway. Access gateway 130 uses the upper four bits of the PDN-context-ID and matches it with the upper four bits of the reservation label to map the PDN-context with IP-flow-ID. The usage of multiple PDN-contexts (for the same PDN) is kept transparent to the RAN 110 and to the RLP-flow. This allows flexible/loose association of PDN-contexts with the IP flows for the same PDN. In other words, IP flow does not identify the PDN-context in the identifier. In this manner, multiple PDN-contexts with the same PDN for each type of IP-address may be created, thereby further improving system resource allocation and utilization.

Figure 5:
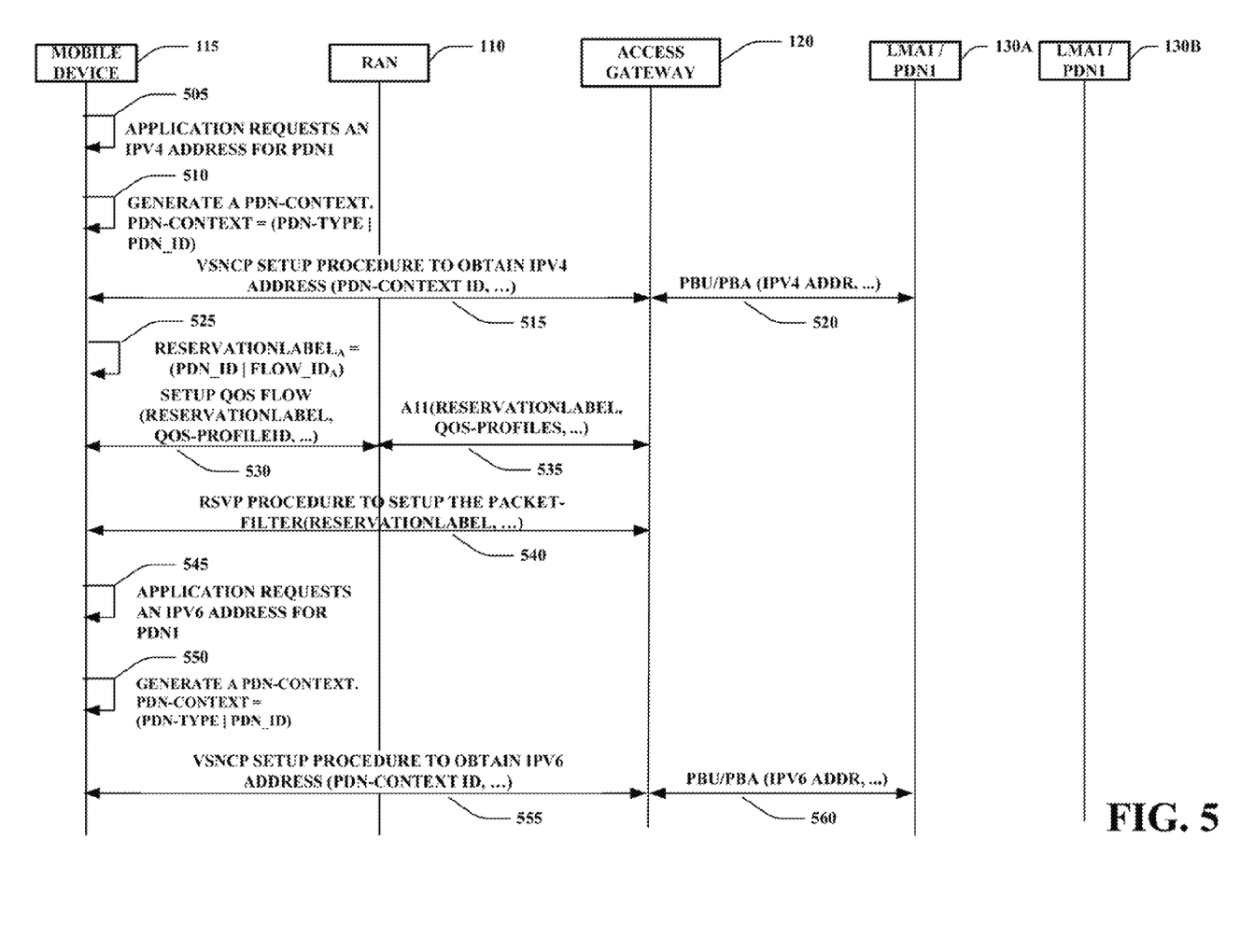
FIG. 5 is an illustration of an example methodology for providing multiple PDN contexts for a single PDN/LMA.

FIG. 5 illustrates a methodology for setting up a PDN-context for a PDSN wireless communication system. In step 505, mobile application requests an IPv4 address for LMA1/PDN1. In step 510, mobile device generates a PDN-context. PDN-Context=(PDN-Type|PDN_ID). PDN_ID may be a 4 bit unique ID that mobile picks randomly for each LMA/PDN. PDN-Type is set to IPv4-Type, since in this case the application has requested an IPv4 address. In step 515, the generated PDN-Context is associated with PDN1 for IPv4 address using a network control protocol such as IPCP or Vendor-Specific Network Control Protocol (VSNCP). In step 520, access gateway sends binding update to the LMA1. In step 525, mobile device generates a reservation label based on this IPv4 connection. For example, in one aspect, Reservation label=(PDN_ID|Flow_IDa). PDN-ID is set to the PDN-ID selected at step 510 for the QoS flows corresponding to that PDN. Flow-ID may be a 4 bit unique ID that mobile device picks randomly for each flow. In step 530, mobile device sets up a QoS flow, which includes the following parameters: reservation label, QoS profile and others. In step 535, RAN 110 sets up an A11 bearer connection based on the QoS flow. In step 540, the RSVP procedure associates the reservation label that is created at step 525 to a packet-filter/QoS. In step 545, another application requests an IPv6 address from the SAME PDN (PDN-1). In step 550, PDN_ID is set to the same PDN-ID that is selected at step 510. PDN-Type is set to IPv6-Type, since application requested an IPv6 address. In step 555, the generated PDN-Context at step 550 is associated with LMA1/PDN1 for IPv6 address using this VSNCP procedure. In step 560, an updated binding update is performed to add IPv6 address to the IPv4 tunnel that is already set at step 525). Alternatively, an independent tunnel may be setup for IPv6.

Figure 8:
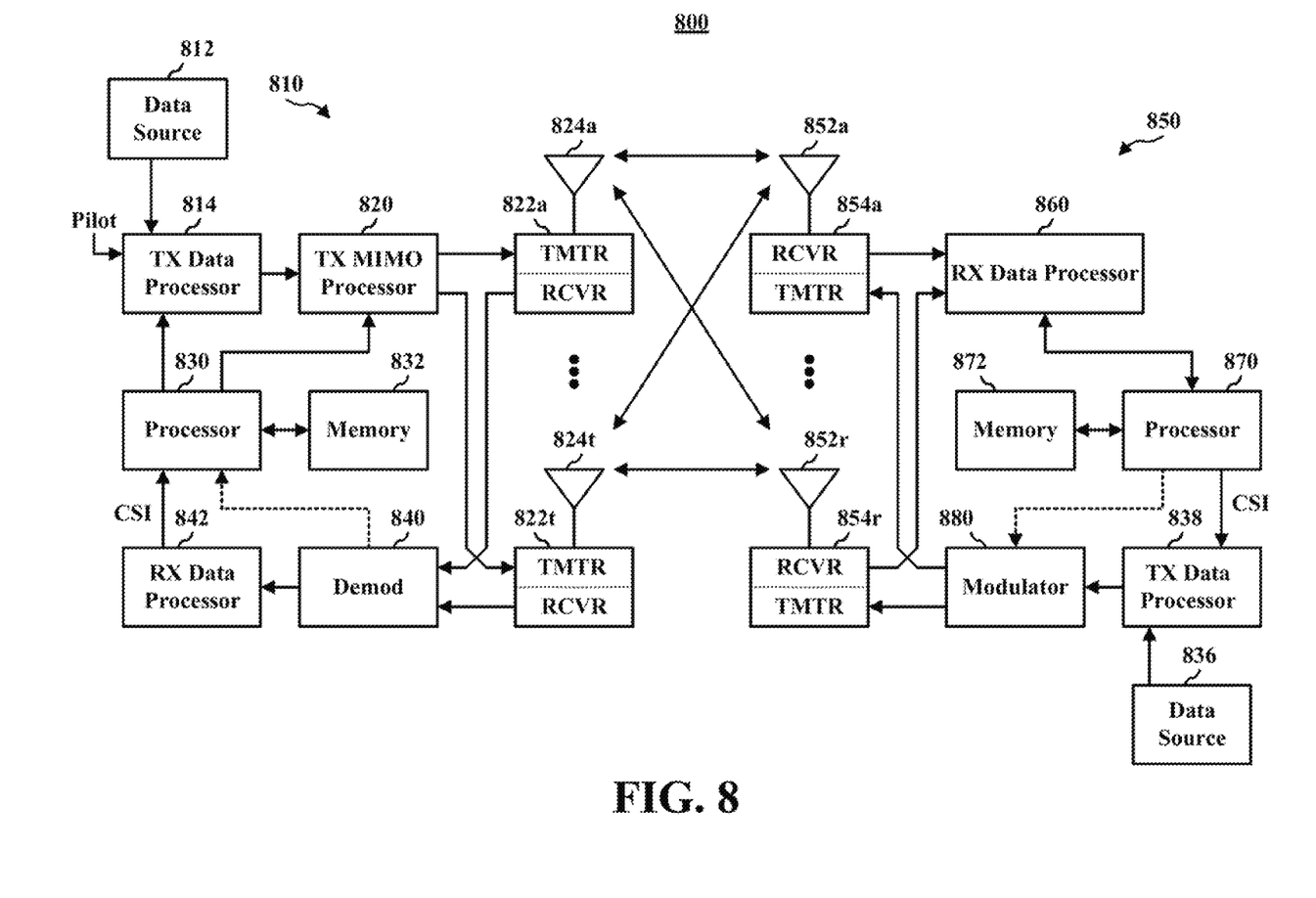
FIG. 8 is an illustration of an example a wireless communication system.

FIG. 8 shows an example wireless communication system 800. The wireless communication system 800 depicts one base station/forward link transmitter 810 in a radio access network and one mobile device 850 for sake of brevity. However, it is to be appreciated that system 800 can include more than one base station/forward link transmitter and/or more than one mobile device, wherein additional base stations/transmitters and/or mobile devices can be substantially similar or different from example base station/forward link transmitters 810 and mobile device 850 described below. In addition, it is to be appreciated that base station/forward link transmitter 810 and/or mobile device 850 can employ the systems (FIG. 1) and/or methods (FIGS. 2-7) described herein to facilitate wireless communication there between.

At base station/forward link transmitter 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides NT modulation symbol streams to NT transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 822a through 822t are transmitted from NT antennas 824a through 824t, respectively.

At mobile device 850, the transmitted modulated signals are received by NR antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the NR received symbol streams from NR receivers 854 based on a particular receiver processing technique to provide NT "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station/forward link transmitter 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station/forward link transmitter 810.

At base station/forward link transmitter 810, the modulated signals from mobile device 850 can be received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights. It is to be appreciated that in the case of a forward link transmitter 810, as opposed to a base station, these RX components may not be present since data is only broadcasted over the forward link.

Processors 830 and 870 can direct (e.g., control, coordinate, manage, etc.) operation at base station/forward link transmitter 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
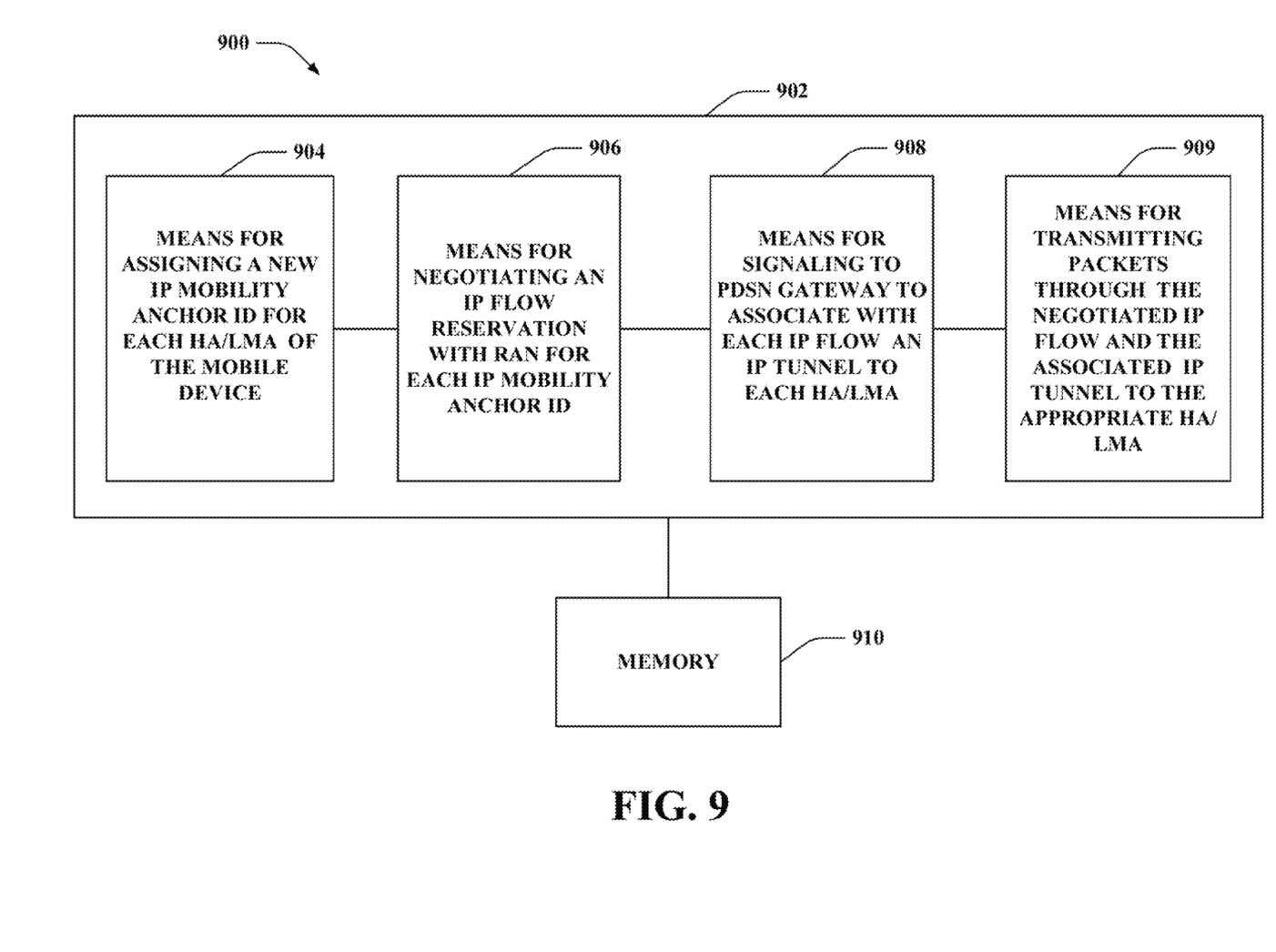
FIG. 9 is an illustration of an example system for multiplexing of simultaneous multiple HA/LMA connections.

Turning to FIG. 9, illustrated is a system 900 for multiplexing multiple simultaneous HAs/LMAs connections. System 900 can reside within a mobile device. As depicted, system 900 includes functional blocks that can represent functions implemented by a processor, software, or combination thereof (e.g., firmware). System 900 includes a logical grouping 902 of electrical components that facilitate multiplexing multiple simultaneous HAs/LMAs connections. Logical grouping 902 can include means 904 for creating and assign a unique IP mobility anchor identifier to each HA/LMA to which the mobile device wants to connect. Moreover, logical grouping 902 can include means 906 for negotiating with a RAN an IP flows (e.g., RLP flows) for each IP mobility anchor identifier. The RAN in turn may set up respective bearer connections (e.g., A10/A11 connections) to a PDSN gateway to support the negotiated IP flows from mobile device. Furthermore, logical grouping 902 can include means 908 for signaling a request to PDSN gateway to associate each negotiated IP flow with an IP tunnel to a particular HAs/LMAs. Lastly, logical grouping 902 can include means 909 for transmitting packets through the negotiated IP flow and associated IP tunnel to the appropriate HA/LMA. The packets sent through each negotiated IP flow are being multiplexed by PDSN gateway into the appropriate IP tunnels based on the association of the IP flow with the specified HA/LMA. Additionally, system 900 can include a memory 910 that retains instructions for executing functions associated with electrical components 904, 906, 908 and 909. While shown as being external to memory 910, it is to be understood that electrical components 904, 906, 908 and 909 can exist within memory 910.

Figure 10:
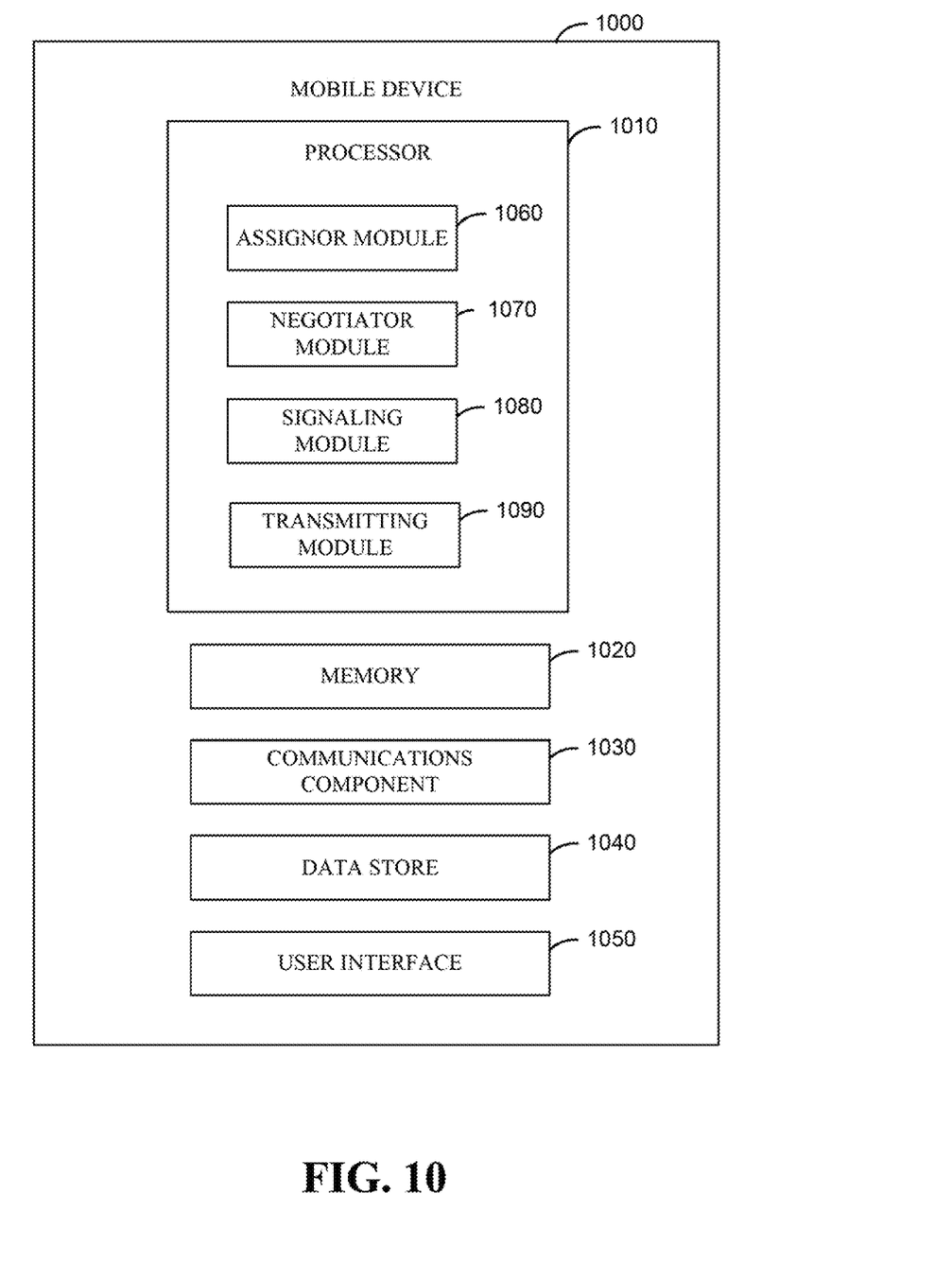
FIG. 10 is an illustration of an example mobile device operable to create and support simultaneous multiple HA/LMA connections.

FIG. 10 illustrates an example mobile device 1000 operable to create and support simultaneous multiple HA/LMA connections in accordance with methodologies disclosed herein. Mobile device 1000 includes a processor 1010 for carrying out processing functions associated with one or more of components and functions described herein. Processor 1010 can include a single or multiple set of processors or multi-core processors. Mobile device 1000 further includes a memory 1020 coupled to processor 1010, such as for storing local versions of applications being executed by processor 1010. Memory 1020 can include any type of memory usable by a computer, such as random access memory (RAM), read only memory (ROM), magnetic discs, optical discs, volatile memory, non-volatile memory, and any combination thereof.

Further, mobile device 1000 includes a communications component 1030 coupled to processor 1010 for establishing and maintaining communications with one or more radio access networks utilizing hardware, software, and services as described herein. For example, communications component 1030 may include transmit chain components and receive chain components associated with a transmitter and receiver, respectively, operable for interfacing with external radio networks and devices. Additionally, mobile device 1000 may further include a data store 1040 coupled to processor 1010, which can be any suitable combination of hardware and/or software, that provides for mass storage of information, databases, and programs employed in connection with aspects described herein. For example, data store 1040 may be a data repository for applications not currently being executed by processor 1010.

Mobile device 1000 may include a user interface component 1050 coupled to processor 1010 and being operable to receive inputs from a user of mobile device 1000 and further operable to generate outputs for presentation to the user. User interface component 1050 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1050 may include one or more output devices, including but not limited to a display, a speaker, a haptic feedback mechanism, a printer, any other mechanism capable of presenting an output to a user, or any combination thereof.

In one example aspect, processor 1010 includes an assignor module 1070 operable to create and assign a unique IP mobility anchor identifier to each HA/LMA to which mobile device 1000 wants to connect. Processor 1010 may also include a negotiator module 1070 operable to negotiate with an access radio network an IP flow (e.g., RLP flow) for each IP mobility anchor identifier. Processor 1010 may further include a signaling module 1080 for instructing communications component 1030 to signal a request to an access gateway to associate each negotiated IP flow with an IP tunnel to a particular HAs/LMAs. Processor 1010 may also include a transmitting module 1090 for instructing communications component 1030 to transmit packets through the negotiated IP flow and associated IP tunnel to the appropriate HA/LMA. Processor 1010 may include other modules for facilitating simultaneous multiple HA/LMA connections in accordance with methodologies disclosed herein.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communications, comprising:
assigning a unique IP mobility anchor identifier to each of a plurality of IP mobility anchors associated with a mobile device for providing a plurality of associated services, the IP mobility anchors selected from the group consisting of Home Agents (HAs) and Local Mobility Anchors (LMAs);
negotiating an IP flow reservation for each service between the mobile device and the respective IP mobility anchor for each IP mobility anchor identifier;
signaling a request from the mobile device to associate an IP flow of each negotiated IP flow reservation with an IP tunnel to a particular IP mobility anchor; and
multiplexing multiple simultaneous connections from the mobile device to the plurality of IP mobility anchors in the mobile IP network by sending packets for each service through each respective IP flow and associated IP tunnel to each of the plurality of IP mobility anchors.

2. The method of claim 1, wherein negotiating an IP flow reservation includes generating a reservation label for each IP flow, wherein a reservation label include at least an IP flow identifier and the IP mobility anchor identifier.

3. The method of claim 2, wherein negotiating an IP flow reservation further includes creating an attribute identifying structure of the reservation label, and communicating the attribute to a radio access network (RAN).

4. The method of claim 3, wherein negotiating an IP flow reservation further includes negotiating an IP flow reservation with the RAN using the reservation label and wherein for each negotiated IP flow RAN creates at least one bearer connection for each IP mobility anchor.

5. The method of claim 4, wherein signaling a request further includes signaling to an access gateway a request to associate each negotiated IP flow with an IP tunnel to a particular IP mobility anchor.

6. The method of claim 5, wherein signaling a request includes sending to the access gateway a name of the particular IP mobility anchor and wherein access gateway associates the name of the particular IP mobility anchor with the IP flow identified by the IP mobility anchor identifier.

7. The method of claim 6, wherein packets sent through one or more negotiated IP flow are being mapped by the access gateway into an IP tunnels based on the association of the IP flow with the particular IP mobility anchor.

8. The method of claim 5, wherein the access gateway includes one of a PDSN or HRPD serving gateway.

9. The method of claim 1, wherein the IP mobility anchor includes one of a mobile IP home agent and a proxy mobile IP local mobility anchor.

10. The method of claim 1, wherein an IP tunnel includes a bidirectional Proxy Mobile IP (PMIP) tunnel.

11. The method of claim 1, wherein negotiating an IP flow reservation includes negotiating a Quality of Service (QoS) treatment for each IP flow.

12. The method of claim 11, wherein the access gateway uses the IP mobility anchor identifier to correlate the associated IP mobility anchor context to the IP flow for that IP mobility anchor.

13. The method of claim 1, further comprising creating an IP mobility anchor context for each IP mobility anchor identifier, the context comprising an IP mobility anchor identifier and an IP mobility anchor context type.

14. The method of claim 13, wherein the IP mobility anchor context type includes one or more of IPv4, IPv6 and IPv4/IPv6.

15. A mobile device, comprising:
a processor and a communications component coupled to the processor, the processor being configured to:
assign a unique IP mobility anchor identifier to each of a plurality of IP mobility anchors associated with the mobile device for providing a plurality of associated services, the IP mobility anchors selected from the group consisting of Home Agents (HAs) and Local Mobility Anchors (LMAs);
negotiate an IP flow reservation for each service between the mobile device and the respective IP mobility anchor for each IP mobility anchor identifier;
signal using the communications component a request to associate an IP flow of each negotiated IP flow reservation with an IP tunnel to a particular IP mobility anchor; and
multiplex multiple simultaneous connections from the mobile device to the plurality of IP mobility anchors in a mobile IP network by sending the communications component packets for each service through each respective IP flow and associated IP tunnel to each of the plurality of IP mobility anchors.

16. The mobile device of claim 15, wherein the processor is further configured to generate a reservation label for each IP flow, wherein a reservation label include at least an IP flow identifier and the IP mobility anchor identifier.

17. The mobile device of claim 16, wherein the processor is further configured to negotiate an IP flow reservation with a radio access network (RAN) using the reservation label and wherein for each negotiated IP flow the RAN creates at least one bearer connection to an access gateway.

18. The mobile device of claim 17, wherein the processor is further configured to signal to the access gateway a request to associate each negotiated IP flow with an IP tunnel to a particular IP mobility anchor.

19. The mobile device of claim 18, wherein packets sent through one or more negotiated IP flow are being mapped by the access gateway into an IP tunnel based on the association of the IP flow with the particular IP mobility anchor.

20. The mobile device of claim 19, wherein the processor is further configured to create an IP mobility anchor context for each IP mobility anchor identifier, the context comprising an IP mobility anchor identifier and an IP mobility anchor context type.

21. The mobile device of claim 20, wherein the access gateway uses the IP mobility anchor identifier to correlate the associated IP mobility anchor context to the IP flow for that IP mobility anchor.

22. A non-transitory computer-readable medium having stored thereon processor-executable instructions configured to cause a processor of a mobile device to perform operations comprising:
assigning a unique IP mobility anchor identifier to each of a plurality of IP mobility anchors associated with the mobile device for providing a plurality of associated services, the IP mobility anchors selected from the group consisting of Home Agents (HAs) and Local Mobility Anchors (LMAs);
negotiating an IP flow reservation for each service between the mobile device and the respective IP mobility anchor for each IP mobility anchor identifier;
signaling a request to associate an IP flow of each negotiated IP flow reservation with an IP tunnel to a particular IP mobility anchor; and
multiplexing multiple simultaneous connections from the mobile device to the plurality of IP mobility anchors in the mobile IP network by sending packets for each service through each respective IP flow and associated IP tunnel to each of the plurality of IP mobility anchors.

23. The non-transitory computer-readable medium of claim 22, wherein the processor-executable instructions are further configured to cause the processor to perform operations causing the mobile device to generate a reservation label for each IP flow, wherein a reservation label include at least an IP flow identifier and the IP mobility anchor identifier.

24. The non-transitory computer-readable medium of claim 23, wherein the processor-executable instructions are further configured to cause the processor to perform operations causing the mobile device to negotiate an IP flow reservation with a radio access network (RAN) using the reservation label and wherein for each negotiated IP flow RAN creates at least one bearer connection to an access gateway.

25. The non-transitory computer-readable medium of claim 24, wherein the processor-executable instructions are further configured to cause the processor to perform operations causing the mobile device to signal to the access gateway a request to associate each negotiated IP flow with an IP tunnel to a particular IP mobility anchor.

26. The non-transitory computer-readable medium of claim 25, wherein packets sent through each negotiated IP flow are being mapped by the access gateway into one or more IP tunnels based on the association of the IP flow with the particular IP mobility anchor.

27. An apparatus, comprising:
means for assigning a unique IP mobility anchor identifier to each of a plurality of IP mobility anchors associated with a mobile device for providing a plurality of associated services, the IP mobility anchors selected from the group consisting of Home Agents (HAs) and Local Mobility Anchors (LMAs);
means for negotiating an IP flow reservation for each service between the apparatus and the respective IP mobility anchor for each IP mobility anchor identifier;
means for signaling a request to associate an IP flow of each negotiated IP flow reservation with an IP tunnel to a particular IP mobility anchor; and
means for multiplexing multiple simultaneous connections from the mobile device to the plurality of IP mobility anchors in the mobile IP network by sending packets for each service through each respective IP flow and associated IP tunnel to each of the plurality of IP mobility anchors.

28. The apparatus of claim 27, wherein the means for negotiating an IP flow reservation includes means for generating a reservation label for each IP flow, wherein a reservation label include at least an IP flow identifier and the IP mobility anchor identifier.

29. The apparatus of claim 28, wherein the means for negotiating an IP flow reservation further includes means for negotiating an IP flow reservation with a radio access network (RAN) using the reservation label and wherein for each negotiated IP flow RAN creates at least one bearer connection to an access gateway.

30. The apparatus of claim 29, wherein the means for signaling a request further includes means for signaling to the access gateway a request to associate each negotiated IP flow with an IP tunnel to a particular IP mobility anchor.

31. The apparatus of claim 30, wherein the packets sent through each negotiated IP flow are being mapped by the access gateway into one or more IP tunnels based on the association of the IP flow with the particular IP mobility anchor.

\* \* \* \* \*